Aug. 22, 1950 A. B. MORRIS 2,519,781
APPARATUS FOR CLEANING AND/OR GRADING FOR
SIZE, SAND, OR OTHER SIMILAR SUBSTANCES
Filed Sept. 30, 1946 2 Sheets-Sheet 1

Inventor:
A. B. Morris,

By Prevost + Prevost
Attorneys

Aug. 22, 1950 A. B. MORRIS 2,519,781
APPARATUS FOR CLEANING AND/OR GRADING FOR
SIZE, SAND, OR OTHER SIMILAR SUBSTANCES
Filed Sept. 30, 1946 2 Sheets-Sheet 2
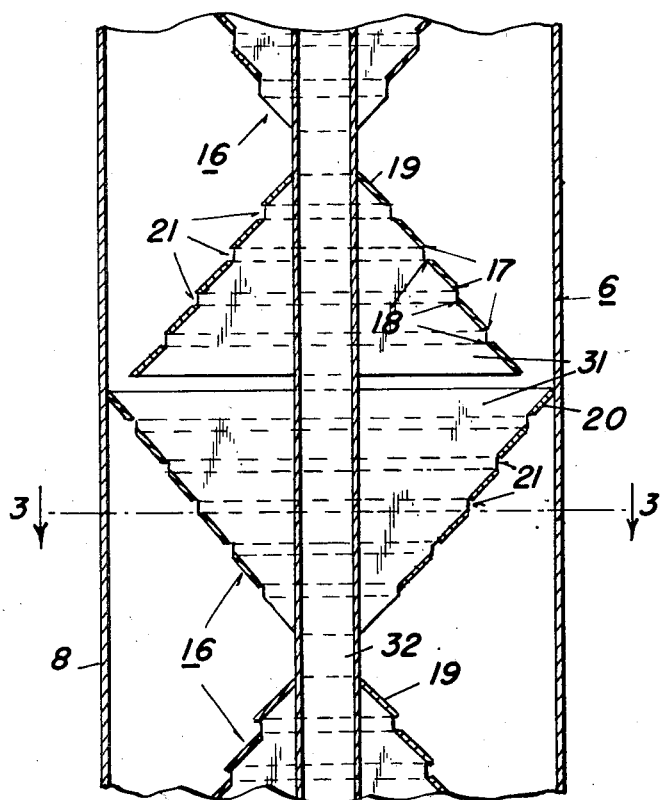
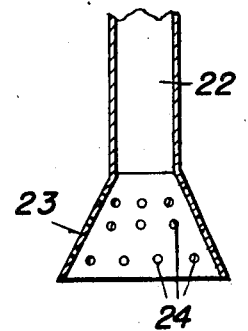
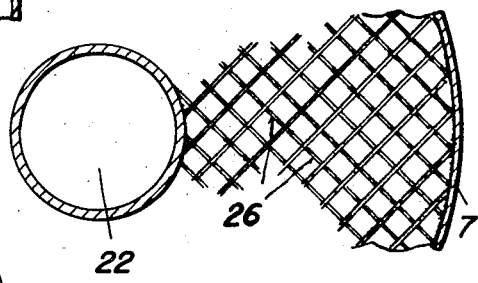
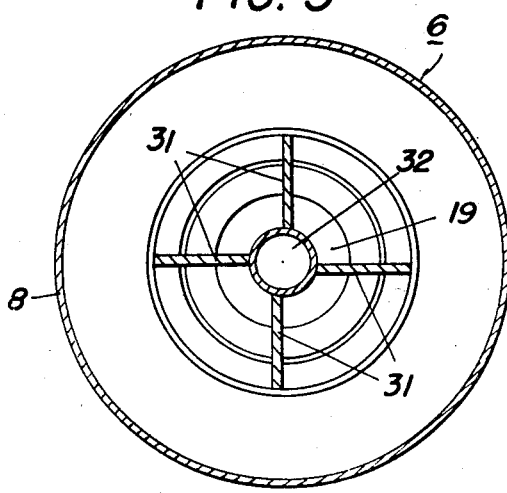
Inventor:
A. B. Morris,
Prevost & Prevost
Attorneys Patented Aug. 22, 1950

2,519,781

UNITED STATES PATENT OFFICE 2,519,781

APPARATUS FOR CLEANING AND/OR GRADING FOR SIZE, SAND, OR OTHER SIMILAR SUBSTANCES

Alexander B. Morris, San Antonio, Tex.

Application September 30, 1946, Serial No. 700,206

9 Claims. (Cl. 209—132)

This invention relates to a method of and apparatus for cleaning and/or grading for size, sand or other similar substances occurring as aggregations of separate granules, and the present application is a continuation-in-part of my application, Serial No. 489,092, filed May 29, 1943, now Patent No. 2,426,839, dated September 2, 1947.

One example of my invention consists in passing sand downward through one of a series of two or more vertical columns, substantially similar in design, through a system of specially arranged compartments and counter-current to a stream of water flowing upward through the column or columns; the dirt and the finer particles of sand passing out the top of each column with the overflow therefrom, and the coarser particles of the solid material reaching each column working their way downward to a suitable sump, from which, as cleaned or graded sand, they may be removed by a drag, pump, screw, elevator or other suitable device.

One of the objects of the invention is to provide an apparatus for practicing the above method and in which baffles defining the compartments are of frusto-conical shape and arranged co-axially with the axis of the vertical column, the base of some of the baffles being at the bottom and the base of others being at the top whereby the baffles in effect form compartments of substantially the same diameter as the inner diameter of the column, and in shape alternately bi-conical and conical spindle.

Another object of the invention is to provide novel means for supporting the baffles within the column.

A still further object is to supply novel means for introducing the aggregation of separate granules into the column.

With the foregoing objects outlined and with other objects in view which will appear as the description proceeds, the invention consists in the novel features hereinafter described in detail, illustrated in the accompanying drawings, and more particularly pointed out in the appended claims.

In the drawings:

Fig. 2 is a fragmentary vertical sectional view of a portion of one of the columns and illustrating the frusto-conical baffles and the manner of supporting the same within the column.

Fig. 3 is a horizontal sectional view taken on the line 3—3 of Fig. 2.

Fig. 4 is a diametrical vertical sectional view of the nozzle through which the aggregations of separate granules are introduced into the column.

Fig. 5 is a fragmentary horizontal sectional view of the column and illustrating the means for preventing turbulence of the liquid, carrying particles of a desired size immediately before such liquid is discharged from the upper end portion of the column.

Figure 1:
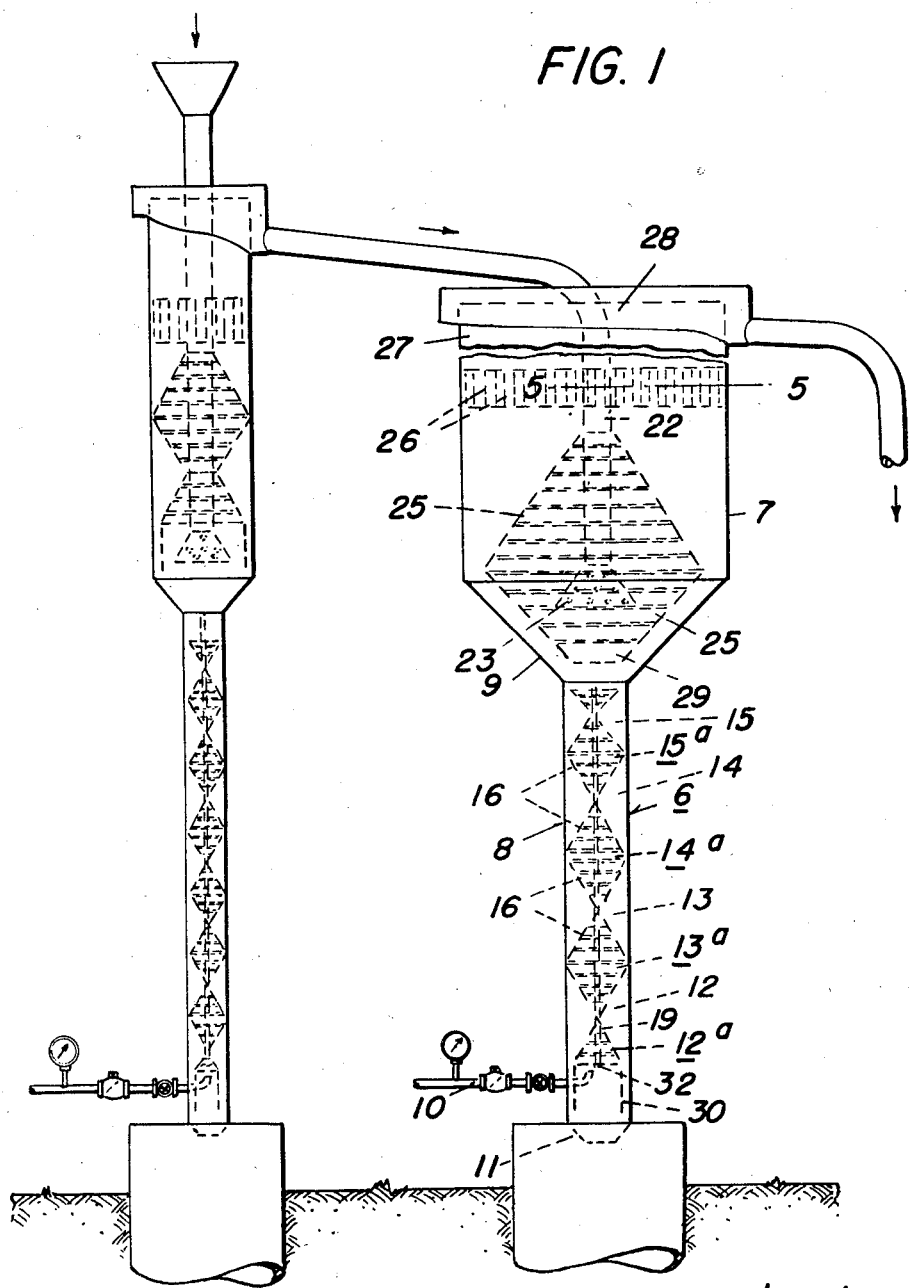
Fig. 1 is a side elevation of an apparatus in accordance with the invention and by which my novel method may be practiced.

For the purposes of description, only the first column of such a series of columns will be described, it being understood that all succeeding columns will be identical in principle and will differ only in the relative size of the various parts. In order to accomplish the desired purposes, I propose a vertical column 6, 30' to 40' in height, the upper portion 7 of which has a diameter greater than that of the lower portion 8, the swage 9 between the two diameters being in the shape of a frustum of a cone of at least 45° slope. Into the bottom of this column clean water is admitted through a pipe 10 at a rate of flow such that the upward velocity of the stream through the lower section of the column itself will be slightly greater than the rate at which the smallest particles desired in the cleaned or graded sand will sink through still water. This inlet for clean water is placed above the sump 11 for collecting the cleaned or graded sand. Above the water intake, extending to the top of the lower or small diameter portion of the column, the space is divided into a series of compartments 12—15 and 12a to 15a, separated from each other by partitions 16 (Figs. 2 and 3) which have a slope sufficient to cause the sand to slip downward over them. These compartments consist each of a series of horizontal sections cut from the same cone, the lower edge 17 of each section being spaced a short distance, such as 1 inch or a fraction thereof, vertically above the upper edge 18 of the next lower section; all such sections being concentrically mounted about the axis of the column. The first such partition above the water intake has the apex 19 of the cone at the center of the column and the successive ring sections extend downward and outward from the center, reaching to within a short distance from the column wall. The next higher such partition is inverted with respect to the first one, and the topmost ring 20 of this partition is close to or in contact with the column wall, and slopes downward and inward toward the center of the column. On this partition and all similarly positioned, the apex of the cone is omitted so as to leave a central opening through which the downward moving sand may pass out of such cone and onto the outside of the cone below it. The lower, small diameter portion of the column is thus divided into a series of compartments, the bottoms of which cause the sand to pass from the outside wall of the column toward its center, and from its center toward the perimeter, thus thoroughly diffusing the sand and preventing it from establishing definite paths over the partitions and thus tending to by-pass contact with the upwardly rising water which issues from the openings between the conical ring sections comprising the partitions between the compartments. Another important feature of this form of partition between compartments is that successively one partition tends to force the rising water toward the center of the column while the next above it tends to force the water outward toward the perimeter, thus breaking up any tendency for the water to establish definite areas in the column cross section through which it moves upward more easily and with greater velocity than through others. Viewed in vertical cross section, this arrangement of slotted-bottom conical partitions gives the appearance of a series of flights of steps, leading upward from near the wall of the column to its center, where the steps from each side meet in a point, and from near the center upward and back toward the wall; the spaces where, in a flight of steps the risers would be located, being openings 21 for the escape of the water between the rings. The entire lower, small diameter portion of the column above the intake for clean water is divided into such compartments by an even number of such partitions, so that the uppermost partition slopes from the perimeter inward and the lowermost slopes from the center toward the perimeter.

The sand is introduced into the column in the form of a slurry or even as a very thin mixture of sand, dirt and water, through a down pipe 22 axially located with respect to the upper, large diameter portion of the column, and terminating within the conical swage between the two portions of the column. The lower end of this feed-pipe terminates (Fig. 4) in a conical nozzle 23 with the base end open and facing downward, the wall of the cone being pierced with small holes 24 to permit the even escape of the entering mixture across the entire cross section of the upper large diameter portion of the column. The upper large diameter portion of the column is divided into separate compartments by a similar arrangement of sloping partitions 25 consisting of frusto-conical horizontal rings which conduct such solids as may fall upon them from the perimeter of the column toward the central feed-stack, and from the vicinity of the feed-stack outward toward the perimeter of the column. In general, only two such partitions will be required in this upper, large diameter portion, the lower one immediately above the nozzle of the feed-pipe sloping downward and outward, and the next one above it sloping downward and inward toward the feed-stack, it being understood that the inside edge of the bottom ring of such upper partition has a diameter substantially greater than the outside diameter of the feed-pipe so as to leave room for the downward flow of the sand onto the upper conical ring of the next lower partition.

In order to recover from the fluid mass in the upper portion of the column such of the solid particles as may be within the desired size range for this column, there is placed in the uppermost compartment of the column, above the uppermost sloping partition, but well below the top rim of the column, a series of vertical baffles or straightening vanes 26 (Fig. 5), arranged in honeycomb form, the purpose of which is to break up the turbulence of the water rising through the column and approaching the top rim with its load of dirt and small particles, and thus to restore conditions of straight line flow upward through the uppermost part of the column. Above this bank of straightening vanes, and occupying the uppermost several feet of the column is an empty chamber the full diameter of the column and unobstructed in any way, the purpose of which is to provide a settling chamber in which may settle out of the now quietly rising water in the column any particles of a size which may be desired to be retained in the product, and which may have been carried upward to that point by the turbulence in the water passing through the openings of the partitions below. From the top of this settling chamber, the rising water overflows around the entire perimeter of the column into a trough 28 suitably placed around the top of the column, from which the overflow is conducted either to the next succeeding column in a series of such columns, as the feed thereof, or, in the event that only one column is in use, to the waste pond.

In operation the entering mixture of water and solids, entering the column approximately within the swage between the upper, large diameter portion and the lower small diameter portion, will drop out of suspension most of the larger particles which it is intended to retain in the finished product. These will fall directly into the mouth of the lower portion of the column from the top of which is issuing a stream of water at a predetermined appropriate rate sufficient to "float" out all particles smaller than the smallest intended to be included in such product. The diameters of the upper and lower portions of the column are so proportioned relative to each other, that the upward velocity of the combined streams of water entering from the lower portion and that entering with the feed will have an upward velocity through the upper portion approximately the same as the upward velocity of the stream issuing from the top of the lower, smaller diameter portion. The turbulence of these combined streams, further augmented by their passage through the ring-like openings in the partitions between the compartments above the mouth of the feed-stack, will serve, however, to keep entrained many particles approaching in smallness the smallest particle intended to be retained, and will carry these toward the top of the column, from which they would, in ordinary course, escape with the overflow. The straightening vanes 26 above described serve to quell all turbulence in the rising stream thus permitting to settle out all such "border-line" particles. These fall upon the upper of the two partitions 25 in the upper portion of the tower, slide down it and down the lower such partition, being subjected in such course to washing in the upward rising water, and they are by-passed past the mouth of the feed-stack by the following arrangement.

The lower and outside edge of the lowest conical ring forming the first partition above the mouth of the feed-pipe 22 will extend to within a few inches of the periphery of the tower, and may be opposite, vertically, to the lower part of the full diameter of the upper portion, or opposite, vertically, to some level in the conical swage between the two portions. Extending from this lower outside edge of this lowest conical ring next above the mouth of the feed-pipe and substantially parallel in all its elements with the cone of the swage, there is an inverted cone 29 extending downward and inward to end in a horizontal truncating plane a few inches above the top of the lower small-diameter portion of the column. This truncated end is open and its edges are substantially vertically above the periphery of the lower, small diameter portion. Thus is formed between the outer shell of the conical swage between the two portions of the column and this inverted truncated cone, a protected passageway through which may descend and be delivered into the lower portion of the column such "border-line" particles as may have settled out of the rising water in the upper portion of the column, without danger of their being reintrained in the turbulent and more or less colloidal stream entering the swage through the feed-stack. Thus there is delivered into the lower, small diameter portion of the column not only the larger particles directly from the stream entering through the feed-stack, but also these finer particles approaching the low size limit for the product, to be subjected to further washing in passing from one compartment to another of the lower portion entering each time into cleaner and cleaner water. The water issuing from the top of this lower portion will be, ordinarily much cleaner and free from extreme fines, than the water entering with the feed, and it will prevent all but traces of this water from gaining access to the lower portion, thus assuring that such solids as find their way into this lower portion are actually freed from such fine matter as they may have entrained with them in their entrance.

In order that there may accumulate in the bottom of the column a sufficiently deep bed of the finished product to permit this to be drawn off without excessive loss of water, a quiet space must be provided through which the cleaned or graded sand may settle and accumulate, undisturbed by the stream of clean water entering at the bottom of the column. This is accomplished in a manner similar to that used in conducting the particles which settle out in the top of the column past the mouth of the feed-stack, but in this case a cylindrical shield 30 extends from the lower lip of the outside bottom conical ring of the first partition above the clean water input downward, two or three inches inside the outer wall of the column and parallel to it in all its elements, to a point sufficiently below the opening for the clean water so as to be substantially untouched by the incoming stream.

In operation, the pit sand or other raw material is first screened for removal of trash, gravel and other material coarser than the coarsest particle desired to be retained in the finished product. This can generally best be accomplished by wet screening, which will demand varying amounts of water depending upon the material being treated. This amount must first be roughly determined, and the volume of the solids also roughly determined, so that the diameter of the upper portion of the column may be such that the annular space between the outer walls thereof and the central feed-stack will provide an area sufficient to impart to the rising water the velocity required to "float" out all particles smaller than a predetermined minimum. The diameter of the lower portion is determined by the quantity of solids expected to be collected, and the diameter of the upper portion must, as above noted, be sufficient to accommodate the water issuing from this lower portion, maintaining approximately constant the upward velocity of flow through the entire column.

The larger particles settle out close to the mouth of the feed-pipe 22 and sink into the lower portion, through which they proceed from one compartment to the next, flowing downwardly over the conical steps of the partitions in a thin curtain through which passes, as it flows off the edge of each step, the upwardly rising stream of water which entrains in itself all but the larger particles and urging them upward in the column. Since the average rate of upward flow is calculated to "float" out particles of less than a certain size, these will tend to be ejected from the top of the column, while larger particles will tend to work their way toward the bottom of the column. The solids entering at any one moment are thus constrained into a gradual and parallel descent and "slugging" of large masses of undisturbed solids to the bottom, untouched by the rising water is prevented. In each compartment, as the sand enters and flows through it, it is brought into contact with water cleaner than that with which it came in contact in the next compartment above, until it finally comes to rest in the bottom of the column after a final passage through clean water.

If grading into several size classifications is desired, the overflow from the first column is fed into the feed-stack of a second column, the upper, large diameter section of which is larger than the corresponding portion of the first column so as to impart to the water rising through it and overflowing from it, an upward velocity less than that for the first column, and of such measure as to permit to sink through it all particles of greater size than a predetermined minimum for the product desired to be collected in that column. In such second column, the diameter of the lower, small diameter portion is determined by the amount of solids expected to be collected in it, and the diameter of the upper, large diameter section is suited to accommodate the water entering from the lower portion as well as that entering through the feed line 22. The size of the particles in the product collected in the sump of such second column will be smaller than that of the particles collected in the first and smaller column. Similarly, if more size classifications are desired, additional columns can be added, one for each such classification, and in each case the overflow from one becomes the raw feed for the next, until the last column in the series is reached. The overflow from such final column is conducted to the soil pond. In each such column a relatively small amount of clean water is added to the total stream at the bottom of each in order to give a final wash to the particles settling through the lower, small diameter portion.

The outlet valve (not shown) for the solids, placed in the bottom of each tower may be of any one of several types, and may be actuated by mechanism exterior to the column, or by a rod centrally placed and extending out of the top of the column. In this latter case, the partitions between the compartments in the lower section of the column can be supported by radial brackets 31 and 32, built around a centrally situated pipe of small diameter, say 1½ inch or 2 inches, which pipe will serve as a trunk for accommodating the rod for operating the valve. This trunk and rod would also extend upward through the center of the feed-pipe 22.

The advantages of this type of plant over mechanical cleaners and so called "bowl classifiers" now in use are as follows:

The power required to operate this type of washer is only that required to deliver the necessary water at about 40 feet of head.

There are no moving parts to wear or break, and as the sand slipping downward over the partitions is largely supported by water and the surfaces are thus well lubricated with it, there is very little wear on the partitions.

The device can be constructed by any well equipped tank or boiler shop, so that it can be made in almost any industrial area.

The use of heavy moving machinery and the power to operate it is avoided.

As the sand progresses downward through the column it is always encountering cleaner and cleaner water until it comes to rest in clean water at the bottom. This provides a much higher degree of washing than any method depending upon scrubbing and agitation of the main body of the sand in a container from which the excess water overflows over the top, or any method in which the sand-body is kneaded or turned while water is sprayed upon it.

This method is highly elastic, and within very broad limits any one installation can be adapted to any one of a wide variety of results. The only elements of constancy required is constancy of delivery of water, whether with the feed or through the bottom of the column. Since the volume of the solids fed in any unit of time is relatively small with respect to total water in the upper portion of the column, a sudden increase or diminution of solids input will not seriously affect performance. Since the column in both its lower and upper portion are effectively subdivided into definite compartments by specially constructed partitions which are not mere "baffles" in the column, but which occlude substantially its full cross section, three weaknesses in all other counter-current devices for cleaning and classifying such materials are avoided:

1. Slugging of heavy masses of entering sand from the mouth of the feed-stack to the bottom of the column is definitely prevented by the thinning of the descending curtain of sand as it passes over those partitions which slope downwardly and outwardly from the center toward the periphery of the column, and by its re-concentration in the next succeeding compartment as it passes over those partitions which lead downwardly and inwardly from the periphery toward the center.

2. Channelling of the upwardly moving stream of water is similarly broken up and prevented from becoming established by the tendency of these successive conical partitions to successively urge it toward the peripheray and then toward the center.

3. The discharge into the overflow of particles which it is desired to retain in the product is definitely prevented by the straightening vanes placed in the top of the column a suitable distance below the overflow. This device assures that all particles which will sink at a specified rate in still water will be retained within the column and will finally make their way to the bottom sump. Thus is avoided a large loss commonly suffered in other devices not provided with this rigid control.

From the foregoing, it is believed that the construction of the apparatus and the manner of practicing the method may be readily understood, and it is apparent that changes may be made in the details disclosed, without departing from the spirit of the invention, as expressed in the following claims.

What I claim and desire to secure by Letters Patent is:

1. An apparatus of the character described, comprising a substantially vertical column having an upper fluid outlet and a lower solids outlet, first means for introducing loose material consisting of solid particles of various sizes into the column between said outlets, second means for introducing a fluid stream into the column below said first means, and a series of superposed groups of spaced baffles arranged in the column between said outlets, each of said baffles comprising an annulus having an endless wall, and the baffles of respective groups being graduated in diameter so that the composite surfaces of respective groups of baffles are inclined and alternately converge and diverge with respect to the axis of said column, to direct solid particles downwardly and radially relatively to the axis of the column while fluid flows upwardly from said second means through the spaces between the baffles and entrains light solid particles which discharge with the fluid through said fluid outlet.

2. An apparatus as claimed in claim 1, including a honeycomb baffle arranged in the column between the first means and the fluid outlet and positioned above the baffles for preventing turbulence of the fluid before the latter reaches the fluid outlet.

3. An apparatus as claimed in claim 3, including a rod-like support arranged axially within the column and substantially radially disposed brackets fixed to the support and supporting the baffles.

4. An apparatus as claimed in claim 1 in which at least some of the baffles are so arranged as to provide alternate compartments, each consisting of parts of two identical cones joined alternately at their apices and at their bases.

5. An apparatus as claimed in claim 1, including a rod-like support arranged axially within the column, brackets fixed to the support and supporting some of the baffles, the last-mentioned baffles forming a substantially bi-conical compartment within the column and the diameter of said compartment being substatially equal to the inner diameter of the column.

6. An apparatus of the character described, comprising a substantially vertical column having an upper fluid outlet and a lower solids outlet, first means for introducing loose material consisting of solid particles of various sizes into the column between said outlets, said first means having a discharge nozzle, second means for introducing a fluid stream into the column below said first means, and a series of superposed groups of spaced partitions arranged in the column between said outlets, each partition comprising an annulus having an endless wall, and the partitions of respective groups being graduated in diameter so that the composite surfaces of respective groups of partitions are inclined and alternately converge and diverge with respect to the axis of said column to direct solid particles downwardly and radially relatively to the axis of the column while fluid flows upwardly from said second means through the spaces between the partitions and entrains light particles which discharge with the fluid through said fluid outlet, certain of said partitions forming a bi-conical compartment in which the discharge nozzle is arranged.

7. An apparatus of the character described, comprising a substantially vertical column having an upper fluid outlet and a lower solids outlet, a solids inlet for introducing loose material including solid particles of various sizes into the column between said outlets, a fluid inlet for introducing a fluid stream into the column below said solids inlet, a series of substantially conical partitions in said column between said outlets and arranged coaxially in opposed pairs to form a series of alternately shaped concentric compartments, each of said partitions comprising a plurality of superposed spaced annuli, substantially all cross sections of each annulus being inclined relatively to the vertical to direct solid particles downwardly and radially relatively to the axis of the column while fluid flows upwardly from said fluid inlet through the spaces between said annuli and entrains light solid particles which discharge with the fluid through said fluid outlet.

8. An apparatus of the character described, comprising a substantially vertical column having an upper fluid outlet and a lower solids outlet, a solids inlet for introducing loose material including solid particles of various sizes into the column between said outlets, a fluid inlet for introducing a fluid stream into the column below said solids inlet, a series of concentric, apertured baffles vertically spaced in said column and arranged in opposed pairs, the surfaces of said baffles alternately converging and diverging with respect to the axis of said column and extending substantially from the axis to the periphery of said column, to direct solid particles downwardly and radially relatively to the axis of the column while fluid flows upwardly from said fluid inlet through the openings in said baffles and entrains light solid particles which discharge with the fluid through said fluid outlet.

9. An apparatus of the character described, comprising a substantially vertical column having an upper fluid outlet and a lower solids outlet, a solids inlet for introducing loose material including solid particles of various sizes into the column between said outlets, a fluid inlet for introducing a fluid stream into the column below said solids inlet, a series of substantially conical partitions in said column between said outlets and arranged coaxially in opposed, spaced pairs, the radial extremity of each upper partition being spaced inwardly from the walls of said column and the radial extremities of each lower partition being arranged in contact with the walls of said column, and openings in said partitions, whereby solid particles entering said column are directed downwardly and radially by the partitions, throughout substantially the entire area of said column while fluid flows upwardly from said fluid inlet through the openings in said partitions and entrains light solid particles which discharge with the fluid through said fluid outlet.

ALEXANDER B. MORRIS.

REFERENCES CITED

The following references are of record in the file of this patent:

UNITED STATES PATENTS

| Number | Name | Date |
|---|---|---|
| 500,662 | Lockhart | July 4, 1893 |
| 1,128,875 | Hoover | Feb. 16, 1915 |
| 1,552,151 | Stebbins | Jan. 6, 1925 |
| 1,861,248 | Stebbins | May 31, 1932 |
| 2,426,839 | Morris | Sept. 2, 1947 |